United States Patent
Mattson

[15] 3,670,094
[45] June 13, 1972

[54] STRAIN RELIEF WIRE HOLDER
[72] Inventor: William R. Mattson, Gloucester, Mass.
[73] Assignee: Sylvania Electric Products, Inc.
[22] Filed: Oct. 26, 1970
[21] Appl. No.: 83,698

[52] U.S. Cl. .......................... 174/65 R, 174/135, 339/103 R, 339/105
[51] Int. Cl. ...................................................... H01r 13/58
[58] Field of Search ................. 174/65 R, 65 G, 135, 152 G, 174/153 G; 24/126 L, 126 C, 136 B; 248/56; 285/159; 339/103 R, 103 B, 103 C, 103 M, 104, 105, 106, 107

[56] References Cited

UNITED STATES PATENTS

| | | |
|---|---|---|
| 2,258,343 | 10/1941 | Walker ............................ 174/135 UX |
| 2,662,110 | 12/1953 | Fiori .............................. 174/153 G X |
| 3,103,399 | 9/1963 | Martin ............................... 339/105 X |
| 3,218,435 | 11/1965 | Mandziak ......................... 174/135 X |
| 3,300,163 | 1/1967 | Randolph ........................ 174/65 G X |
| 3,499,097 | 3/1970 | Widstrand ......................... 174/135 X |

FOREIGN PATENTS OR APPLICATIONS

| | | | |
|---|---|---|---|
| 789,493 | 1/1958 | Great Britain | ........................ 339/103 |

*Primary Examiner*—Laramie E. Askin
*Attorney*—Norman J. O'Malley and Joseph C. Ryan

[57] ABSTRACT

A strain relief element for electrical supply wires for use with small electrical appliance fixtures. The strain relief element is in the shape of a wedge which is inserted from the outside of the fixture through a wire-way opening. When the wedge is in place, it compresses the supply wires to the inner fixture wall and permanently locks itself to the fixture body.

2 Claims, 2 Drawing Figures

PATENTED JUN 13 1972

3,670,094

WILLIAM R. MATTSON
INVENTOR

BY Joseph C. Ryan
ATTORNEY

STRAIN RELIEF WIRE HOLDER

BACKGROUND OF THE INVENTION

1. Field of the Invention

This invention relates generally to wire restrainers and more particularly to wire restrainers classified as strain relief elements.

Most small electrical appliances such as lamps, and other household appliances must have a wire restraining means to prevent the electrical supply wires from being disconnected from their connections.

2. Description of the Prior Art

Normally, wire restrainers or strain relief elements, as they are called, comprise different variations of compressible U-shaped washers made from materials that are bendable and heat resistant. The fitting of the strain relief element to the wire is done prior to the assembling of the inner electrical components. With this type of restraining only limited amount of external force on the wire is required to dislodge the wires from their internal contacts.

Another objection to this type of strain relief element is that an awkward assembly procedure must be completed before the internal components can be finally assembled in the fixture casing. Also, as mentioned previously, it requires only a small external force to pull the strain relief element along the wire thereby eventually disengaging the wires from the contacts.

SUMMARY OF THE INVENTION

The strain relief element of my invention is put in place on the last phase of the assembly operation. This overcomes the disadvantage of putting the strain relief element on the wire prior to final assembly of the fixture. In its unique wedge design, my strain relief element is placed in locking arrangement with the wire that is located within a wire way of the fixture body by a simple bench ram. The wire is thereby captive by the strain relief wedge and is compressed and locked in place due to a lip on the wedge that contacts an internal surface of the fixture body. With this arrangement, an abnormally large amount of external force would be necessary to dislodge the supply wires from their contacts.

With the above mentioned improvements my unique strain relief wedge overcomes the obvious assembly problems and insures a permanent safe electrical connection to the fixture.

DESCRIPTION OF THE PREFERRED EMBODIMENT

Figure 1:
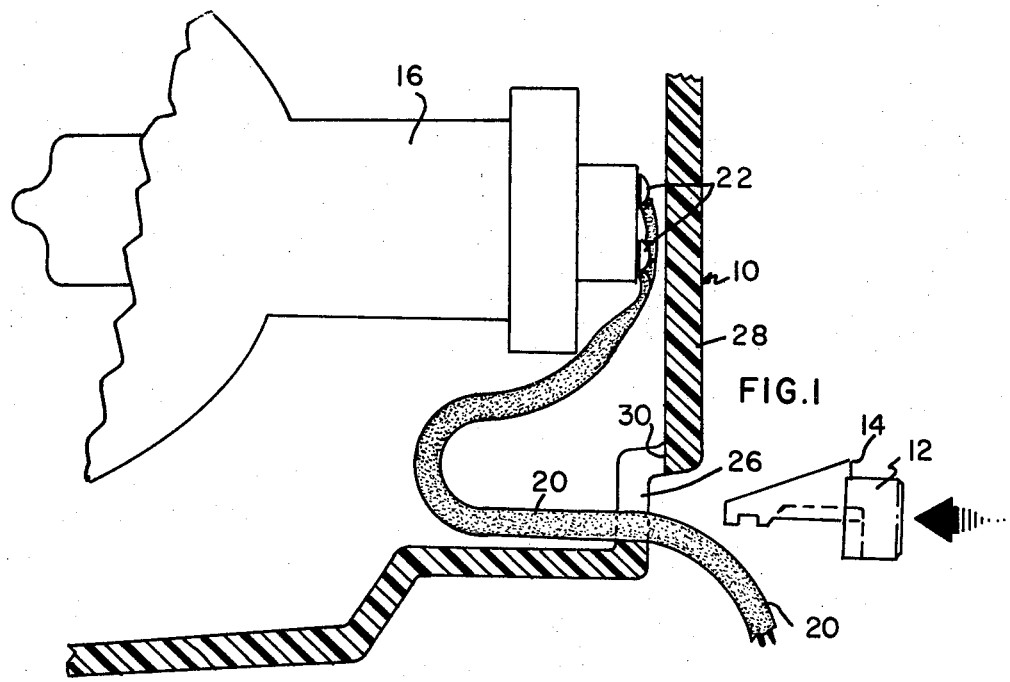
FIG. 1 is a fragmentary cross-sectional view of a lighting unit showing in particular the wire way and a strain relief wedge prior to insertion.

Referring to the figures of the drawing, a fragmentary cross-sectional view of a typical lighting fixture is shown. I have shown this type of fixture in the drawings but the wedge of my invention is not restricted to this application, but can be utilized with a variety of electrical appliances that require locking and restraining of the electrical supply wires.

Basically, my relief strain wedge can be made of various non-metallic materials and various sizes depending on the size of the supply wire needed in each type of application. In the drawings, I show a typical lighting fixture, such as a portable movie light where heat generated by the lamp is a decided factor in material design of the components. For this particular example, the housing 10 is made of a plastic material and the wedge 12 is composed of fiber-filled nylon which is more pliable.

In the drawings, I have shown a typical lighting unit designated as 16 which is positioned within a housing 10. The details of mounting and other features of the lighting unit 16 are not shown but will be understood to be of the standard construction.

In FIG. 1, the fixture shown is assembled to a point where the electrical supply wire 20 is connected to the terminals 22 of the lighting unit 16 and then passes through a wire way 26 in the fixture housing 10. The wire way 26 is designed to have a stop 30 formed by the back wall 28 of the fixture housing 10.

Figure 2:
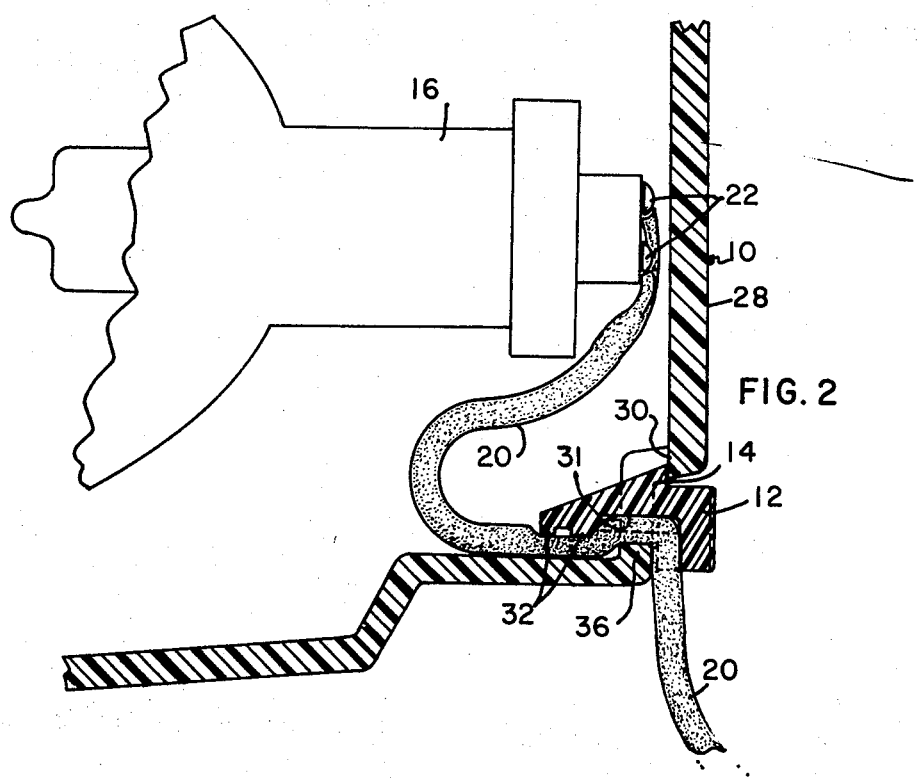
FIG. 2 is a view identical to that of FIG. 1 showing the strain relief wedge in fixed position.

In comparison of FIGS. 1 and 2 it can be seen that the wedge 12 is pressed into the wire way from the position shown in FIG. 1 to that of a locked position of that of FIG. 2. The wedge 12 is positioned by inserting the lip 14 thereof into the wire way 26. Since, as mentioned above, the wedge 12 is more pliable than the housing 10, the lip 14 thereof will be depressed by the wall of the housing 10 but will snap back to its original form to lock it in place. When it is in this locked position, as shown in FIG. 2, the lip 14 is held by the inner wall stop 30. In FIG. 2, the wedge is shown in cross section. It can be seen that the supply wire 20 is not crimped or unduly deformed, but only that portion in contact with the front pressure ridges 32 will be compressed. The central lower portion behind the ridges 32 is cut away to define a recess 31 of clear passage of the supply wire so that it is no pinched at the point of exit, that is, where is passes over the ridge 36 of the housing 10.

With the above-described arrangement the supply wire is firmly held without undue damage to the wire. Also, the pull test of this type of restrainer far exceeds the safe requirements specified for standard strain relief elements.

As my invention, I claim:

1. An electrical fixture comprising: a body member including a wall having a wire-way formed in and extending through an offset portion of said wall, said wall having a stop adjacent to one side of said wire-way and a ridge adjacent to the other side of said wire-way; at least one electrical supply wire extending through said wire way; a wire restraining device in form of a wedge having a lip on one surface and pressure ridges on the other surface; said lip of said wedge interlocking with said stop and said pressure ridges providing perpendicular compression to said electrical supply wire.

2. The combination of claim 1 wherein said body member is of a plastic material and said wire restraining device is of a pliable fiber-filled nylon.

* * * * *